United States Patent
Wilson et al.

(10) Patent No.: US 10,082,214 B2
(45) Date of Patent: Sep. 25, 2018

(54) PINCH VALVE FOR DISPENSING LIQUID

(71) Applicant: A.C. Dispensing Equipment Inc., Lower Sackville (CA)

(72) Inventors: Avery Wilson, Annapolis Royal (CA); Brian Gay, Enfield (CA); Derek Cole, Lower Sackville (CA); Jeffrey Tofflemire, Head of Chezzetcook (CA); Ian MacLean, Fall River (CA); Ronald Shore, Oakfield (CA)

(73) Assignee: A.C. Dispensing Equipment Inc., Lower Sackville (CA)

( * ) Notice: Subject to any disclaimer, the term of this patent is extended or adjusted under 35 U.S.C. 154(b) by 0 days.

(21) Appl. No.: 15/339,205

(22) Filed: Oct. 31, 2016

(65) Prior Publication Data

US 2017/0122451 A1 May 4, 2017

Related U.S. Application Data (60) Provisional application No. 62/248,747, filed on Oct. 30, 2015.

(51) Int. Cl.
| | |
|---|---|
| *F16K 7/04* | (2006.01) |
| *F16K 27/02* | (2006.01) |
| *B67D 1/00* | (2006.01) |
| *B67D 3/04* | (2006.01) |
| *B67D 1/07* | (2006.01) |

(52) U.S. Cl.
CPC ........ *F16K 27/0236* (2013.01); *B67D 1/0082* (2013.01); *B67D 3/041* (2013.01); *B67D 1/07* (2013.01); *B67D 2001/0089* (2013.01); *B67D 2001/0094* (2013.01)

(58) Field of Classification Search
CPC .......... F16K 7/063; F16K 7/066; F16K 7/045; F16K 27/0236; F16K 31/602; F16K 7/04; B67D 1/07; B67D 2001/0094; B67D 2001/0089; B67D 1/0082
USPC ............................... 251/9, 4; 222/185.1, 517
See application file for complete search history.

(56) References Cited

U.S. PATENT DOCUMENTS

| | | | |
|---|---|---|---|
| 2,718,985 A | 9/1955 | Tamminga | |
| 2,806,482 A | 9/1957 | Norris et al. | |
| 3,572,407 A * | 3/1971 | Delorme | B67D 3/0003 141/362 |
| 3,982,724 A | 9/1976 | Citrin | |
| 4,807,845 A * | 2/1989 | Darnell | A61M 39/28 251/7 |

(Continued)

FOREIGN PATENT DOCUMENTS

WO    2014112719 A1    7/2014

OTHER PUBLICATIONS

Canadian Patent Application No. 2946946, Office Action dated Jan. 25, 2018.

(Continued)

*Primary Examiner* — Umashankar Venkatesan
(74) *Attorney, Agent, or Firm* — Borden Ladner Gervais LLP; Louis B. Allard (57) ABSTRACT

A pinch valve for a liquid-dispensing unit or machine has a pinch valve body to which is pivotally secured a closure in a clamshell arrangement. The valve body and the closure define a passageway that can hold a liquid-dispensing tube when the pinch valve is in a closed configuration. The axis about which the closure pivots is perpendicular to the passageway.

19 Claims, 5 Drawing Sheets

(56) References Cited

U.S. PATENT DOCUMENTS

| | | | | |
|---|---|---|---|---|
| 5,265,772 A | * | 11/1993 | Bartasevich | A47K 5/1209 |
| | | | | 222/153.01 |
| 5,938,078 A | * | 8/1999 | Dorsey | B67D 3/0009 |
| | | | | 222/105 |
| 6,120,065 A | | 9/2000 | Chen | |
| 7,104,275 B2 | | 9/2006 | Dille | |
| 8,376,310 B2 | | 2/2013 | Veltrop et al. | |
| 8,979,070 B2 | * | 3/2015 | Keizer | F16K 7/04 |
| | | | | 248/221.11 |
| 9,638,218 B2 | | 5/2017 | Jung et al. | |
| 2006/0011873 A1 | | 1/2006 | Clarke et al. | |
| 2006/0145105 A1 | * | 7/2006 | Ishida | A61M 1/14 |
| | | | | 251/7 |
| 2011/0095212 A1 | | 4/2011 | Brieske | |

OTHER PUBLICATIONS

Canadian Patent Application No. 2,946,978, Office Action dated Nov. 7, 2017.
U.S. Appl. No. 15/339,038, Non-Final Office Action dated Oct. 23, 2017.
U.S. Appl. No. 15/339,083, Non-Final Office Action dated Nov. 2, 2017.

* cited by examiner

PINCH VALVE FOR DISPENSING LIQUID

FIELD

The present disclosure relates generally to pinch valves. More particularly, the present disclosure relates to pinch valves used in liquid dispensers.

BACKGROUND

Cleaning existing liquid dispenser pinch valves often requires that the entire assembly of the pinch valve be taken apart, using tools to remove fasteners, prior to cleaning. This requires time, tools, training, and tracking of the fasteners so they do not get lost. As such, the liquid dispensers can experience considerable downtime, which, in coffee shops, can result in customers desiring cream dispensed in their coffee, to wait longer than necessary.

Additionally, is some instances, existing pinch valves can be prone, when in their open configuration, to being damaged either by the door of the liquid dispenser to which the pinch valve is connected, or by the heavy bag containing milk or cream as it is loaded into the liquid dispenser.

Further, existing pinch valves do not allow easy and quick removal/insertion of dispensing tubes when replacing a spent liquid container from a liquid-dispensing machine and installing a replacement liquid container.

Therefore, improvements in pinch valves are desirable.

SUMMARY

In a first aspect, the present disclosure provides a pinch valve for a liquid-dispensing unit. The pinch valve comprises a valve body for mounting to a liquid dispenser unit; and a closure. The valve body and the closure are configured to define a passageway to hold a liquid-dispensing tube when the pinch valve is in a closed configuration. The valve body and the insert are further configured for rotation of the closure relative to the valve body. The rotation is about a rotation axis that is substantially perpendicular to the passageway.

In a second aspect, the present disclosure provides pinch valve for a liquid-dispensing unit. The pinch valve comprises a valve body for mounting to a liquid dispenser unit; and a closure. The valve body and the closure are configured to define a passageway to hold a liquid-dispensing tube when the pinch valve is in a closed configuration. The valve body and the insert are further configured for rotation of the closure relative to the valve body. The rotation is about a rotation axis that is substantially perpendicular to the liquid-dispensing tube when the dispensing tube is held in the passageway.

BRIEF DESCRIPTION OF THE DRAWINGS

Embodiments of the present disclosure will now be described, by way of example only, with reference to the attached Figures.

DETAILED DESCRIPTION

Figure 1:
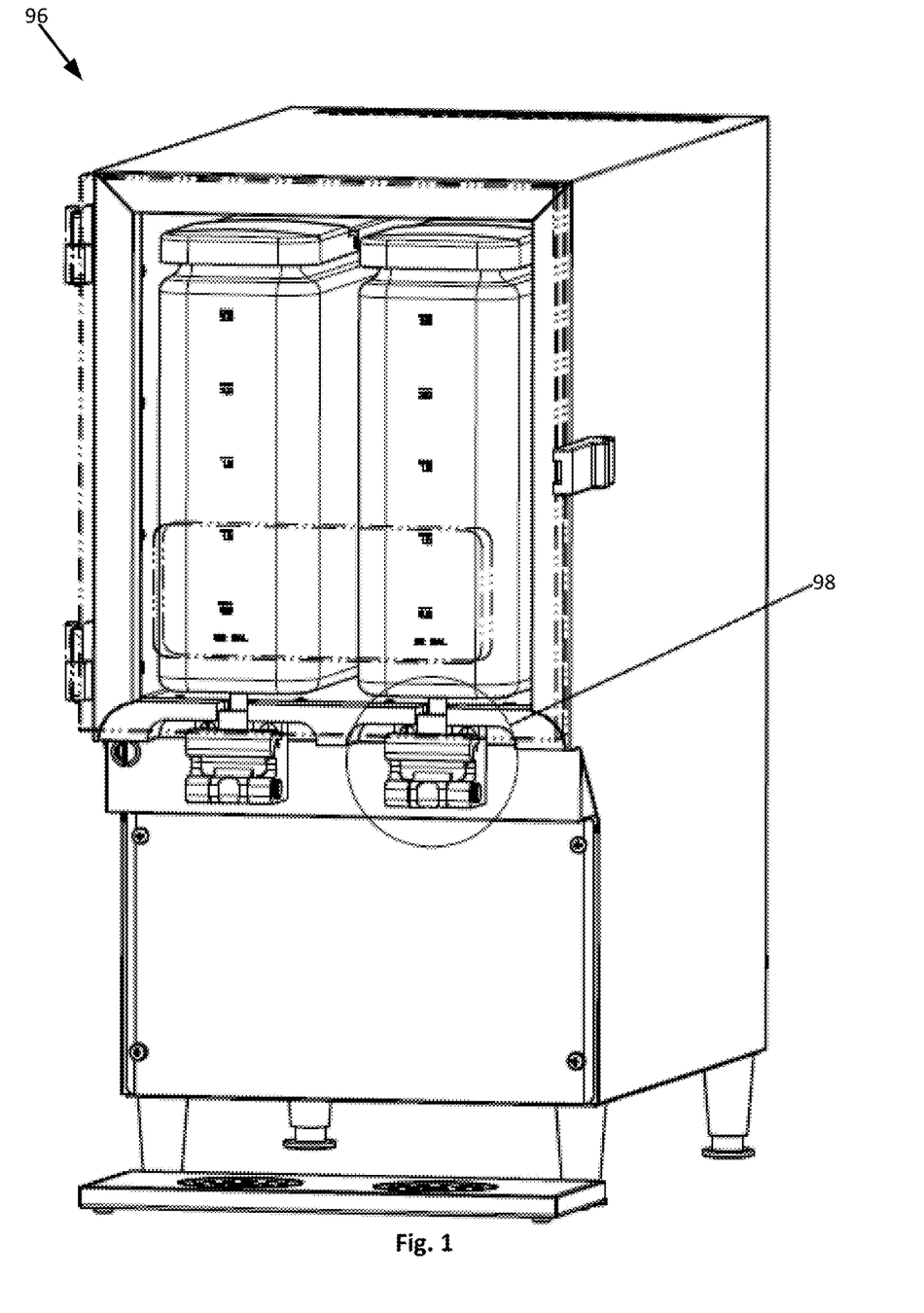
FIG. 1 shows a liquid-dispensing machine equipped with an embodiment of a pinch valve in accordance with the present disclosure.

FIG. 1 shows a front perspective view of a liquid-dispensing machine 96 equipped with a pinch valve 98 in accordance with the present disclosure. The liquid-dispensing machine 96 allows for metered dispensing of liquids such as, for example, milk and cream, into hot beverages such as, for example, tea and coffee.

Figure 2:
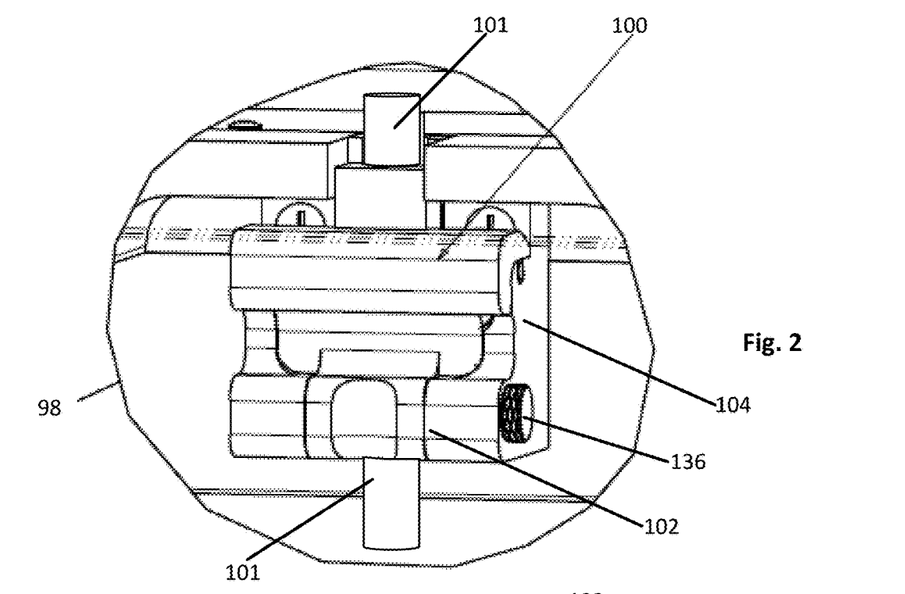
FIG. 2 shows a front perspective view of the pinch valve of FIG. 1, in a closed state.

FIG. 2 shows a front perspective view of the pinch valve 98 in a closed state (closed configuration), where a closure 100 is in a closed position and where a dispensing tube 101 is installed in the pinch valve 100. The top portion of the dispensing tube 101 is connected to a bag or tank (not shown) containing the liquid to be dispensed and the lower end of the dispensing tube acts as the outlet for the liquid.

Figure 3:
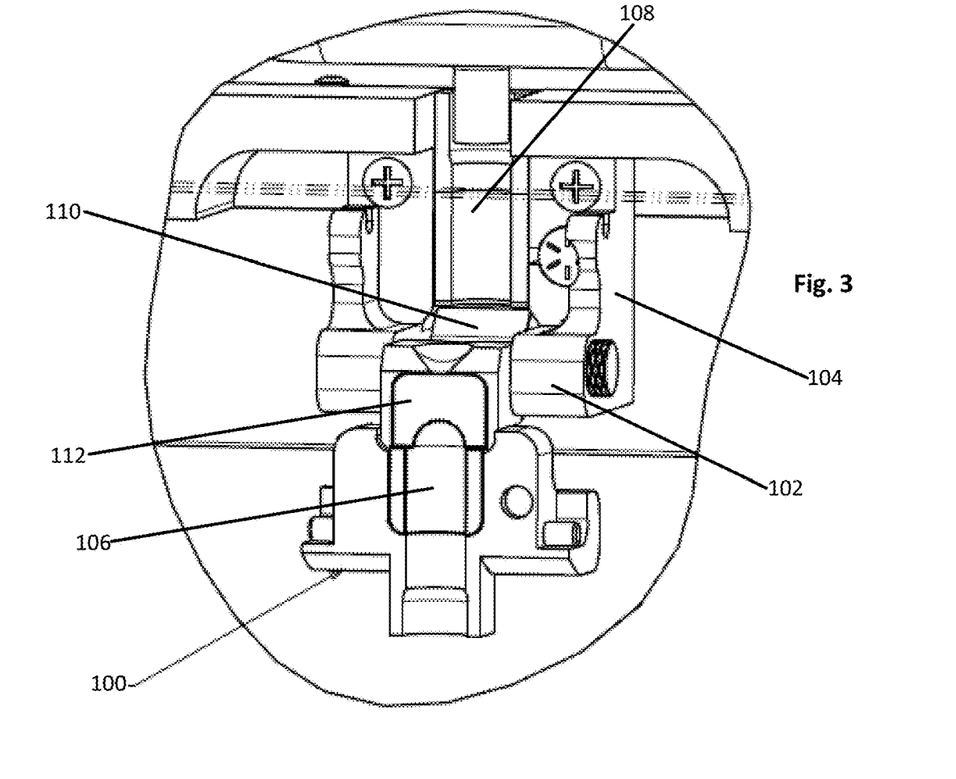
FIG. 3 shows a front perspective view of the pinch valve of FIG. 1, in an open state.

FIG. 3 shows a front perspective view of the pinch valve 98 in an open configuration (open state), where the closure 100 is in an open position. The pinch valve 98 has a hinge 102 about which the closure 100 can pivot from the closed position to the open position. The pinch valve 98 also includes a valve body 104, as shown at FIGS. 2 and 3. The valve body 104 is for holding the closure 100 in the closed position shown at FIG. 2. The closure 100 and the valve body 104 define the hinge 102. The valve body 104 can hold the closure 100 in the closed position through any suitable means FIG. 3 shows a closure insert 106 and a valve body insert 108, which are used to provide refrigeration to the dispensing tube 101 when the dispensing tube 101 is installed in the pinch valve 98. The closure insert 106 and the valve body insert 108 are made of a heat conductive material (e.g., aluminum) to allow removal of heat from the dispensing tube 101. There can be refrigerant gas or liquid running in a copper tube (not shown) behind the pinch valve 98, the copper tube can be thermally connected to the closure insert 106 and the valve body insert 108 through an aluminum tee (not shown). Other embodiments can include only one insert (e.g., the valve body insert 108). Further embodiments can be free of any insert—in these embodiments, the closure and the valve body are not provided with a space to accommodate inserts; rather, the dispensing tube is in contact with the material of which the closure and the valve body are made.

FIG. 3 also shows a plunger tip 110 connected to a plunger assembly (not shown). When the dispensing tube 101 (shown in FIG. 2) is installed in the pinch valve 98 and the closure 100 is in the closed position, the plunger tip 110 pushes the dispensing tube against an inner wall portion (also called a striking surface, configured to receive strikes from the plunger tip) of the closure 100. The inner wall portion can be the inner wall portion 112, which is part of the closure insert 106, or can be an inner wall portion defined by the closure 100 itself. The plunger tip 110 can be biased against the dispensing tube and the inner wall portion 112, by a plunger assembly (e.g., a solenoid plunger assembly), to prevent liquid from flowing through the dispensing tube 101 or, the plunger tip 110 can be retracted away from the inner wall portion 112 to release pressure on the dispensing tube 101 to allow liquid to flow through the dispensing tube 101.

The hinge 102 is configured for the closure 100 to rotate along an axis defined by the pivot pin 136 (the pivot pin can also be referred to as a thumb screw) shown at FIG. 2. In this embodiment, the axis defined by the pivot pin 136 is horizontal and the axis along which the dispensing tube 101 is aligned is vertical. The axis along which the dispensing tube 101 is aligned when installed in the pinch valve 98 is defined by the dispensing tube alignment features of the pinch valve, namely, in this embodiment, the valve body insert 108 and the closure insert 106. These tube alignment features define a passageway to hold the dispensing tube in the pinch valve. As such, in the embodiment of FIGS. 2 and 3, the axis of rotation of the hinge 102 is perpendicular to the dispensing tube 101, that is, the axis of rotation of the hinge 102 is perpendicular to the dispensing tube alignment features of the pinch valve 98. The pivot pin 136 defines a rotation axis; that is, the rotation axis is collinear with the pivot pin 136.

As will be understood by the skilled worker, in the present embodiment of the pinch valve, the closure 100 is hingedly secured to the valve body 104 in a clamshell arrangement (the pinch valve opens and closes as a clamshell).

Figure 4:
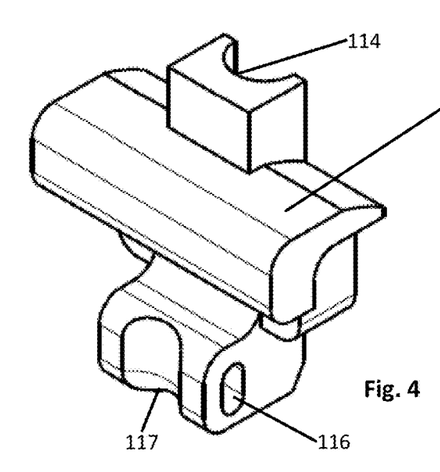
FIG. 4 shows a top front perspective view of a closure of the pinch valve of FIG. 2.

FIG. 4 shows a top front perspective view of the closure 100. The closure 100 defines a recess 114 for receiving a dispensing tube. The recess 114 also serves to align the dispensing tube in the pinch valve. That is, the recess 114 is, in this embodiment, the dispensing tube alignment feature of the closure 100. The closure 100 also defines a through-hole 116 for receiving the pivot pin (e.g., the thumbscrew shown at 136 in FIG. 2) connected to the valve body 104. The through-hole 116 is oblong-shaped to allow for translation of the closure perpendicularly to the pivot pin 136, when the closure 100 is hingedly secured to the valve body 104. As described in further detail below, rotating the closure 104 about the pivot pin 136 and translating the closure perpendicularly to the pivot pin 136 allow for releasably connecting the closure 100 to the valve body 104. In other embodiments, the through-hole in the closure can be circular and a cooperating through-hole in the valve body can be oblong. Any suitable features in the closure and the valve body that allow for the closure to be pivoted with respect to the valve body and to releasably secure the closure and the valve body together are to be considered within the scope of the present disclosure.

FIG. 4 also shows a recess 117 (recess portion) defined by the closure 100. When the closure 100 is in the open position (i.e. when the pinch valve 98 is in the open configuration), any dispensing tube portion still in the pinch valve 98 and protruding below the pinch valve 98 will fit within the recess 117. That is, the recess 117 allows for the closure to be hanging vertically from the valve body 104 even when a dispensing tube is present in the pinch valve. This facilitates removal of the dispensing tube in that, when the closure 100 is in the open position, the dispensing tube is not pushed and bent by the closure 100.

Figure 5:
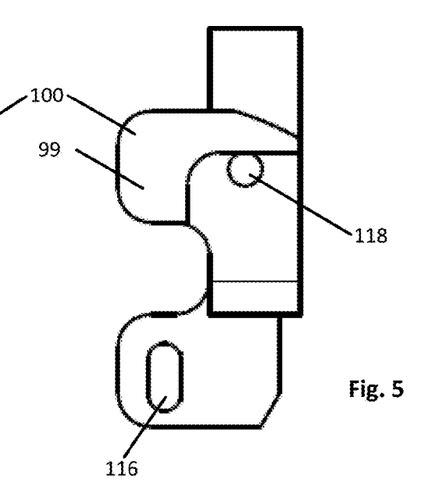
FIG. 5 shows a side elevation view of the closure of FIG. 4.
Figure 14:
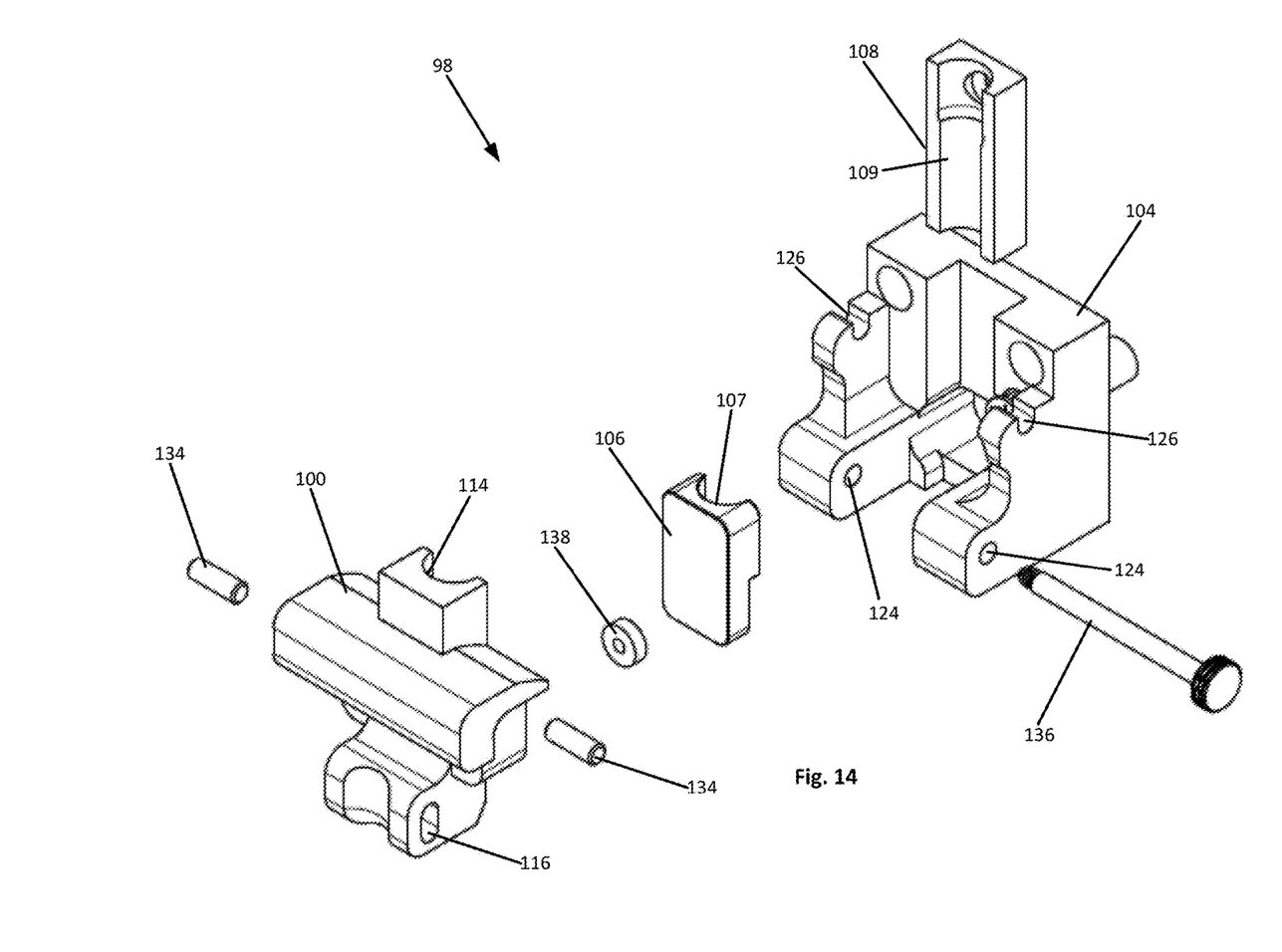
FIG. 14 shows an exploded view of the pinch valve of FIG. 1.

FIG. 5 shows a side elevation view of the closure 100, which further defines an aperture 118 to receive a post (not shown) for engaging the valve body 104. Another aperture 118 is defined on the opposite side of the closure 100 and is also for receiving a post. As state above, the closure 100 can be pivotally connected to the valve body 104 by fitting the pivot pin (136, FIG. 2) through the through-hole 116 and through a through-hole defined in the valve body 104. When pivotally connected to the valve body 104, the closure 100 can be moved to a closed position by pivoting the closure 100 upwardly and by pulling up on the closure 100 in order to allow for the closure 110 to be further rotated to align the posts (not shown) fitted in the aperture 118 with a retaining structure defined on the valve body 104. When the posts in question are aligned with the retaining structure, the closure 100 is lowered to the closed position and retained in that position. Further details are provided below (the posts are shown in FIG. 14, as posts 134). Also shown in FIG. 5 is grip 99 defined by the closure. The grip 99 is for gripping to raise and rotate the closure with respect to the valve body.

Figure 6:
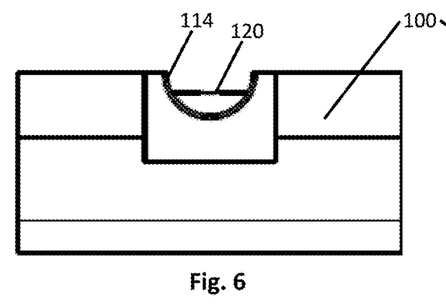
FIG. 6 shows a top view of the closure of FIG. 4.
Figure 7:
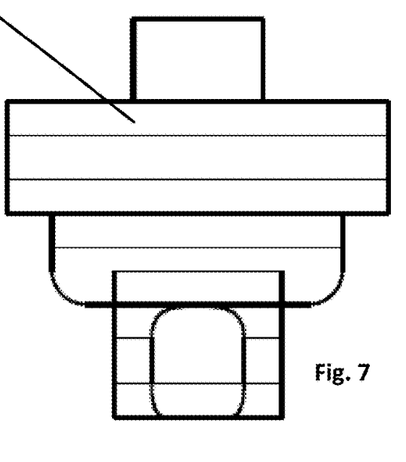
FIG. 7 shows a front view of the closure of FIG. 4.

FIG. 6 shows a top view of the closure 100. Shown at FIG. 6 is the recess 114 and a throttle structure 120 defined by the closure 100. FIG. 7 shows a front view of the closure 100.

Figure 8:
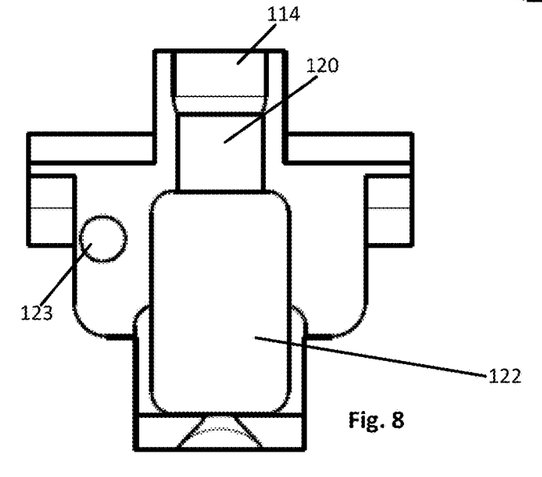
FIG. 8 shows a back view of the closure of FIG. 4.

FIG. 8 shows a back view of the closure 100. The recess 114 and the throttle structure 120 are shown at FIG. 8, as is a cavity 122, which is for receiving the insert 106 shown at FIG. 3. Further, FIG. 8 shows a recess 123 in which a magnet can be installed. The magnet can be used in conjunction with a reed switch installed on the valve body 104, to detect when the closure 100 is in the closed position.

Figure 9:
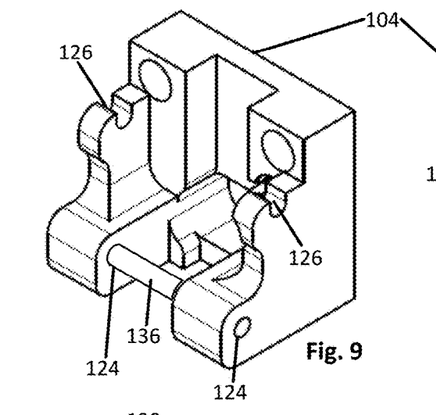
FIG. 9 shows a top front perspective view of the valve body of the pinch valve of FIG. 2.

FIG. 9 shows a top front perspective view of the valve body 104. The valve body 104 defines a pair of apertures 124, which are in alignment with each other. The apertures 104 are for receiving the aforementioned pivot pin 136, shown here partially (without the thumbscrew knob), installed in the apertures 124 (the present embodiment of the pivot pin 136 is shown, in its entirety, at FIG. 14). The closure 100 and the valve body 104 are brought together to position the slot 116 of the closure 100 between the apertures 124. When the slot 116 is aligned with the apertures 124, the pivot pin 136 is installed to traverse the apertures 124 and the slot 116. The pivot pin 136 pivotally connects the closure 100 to the valve body 104.

FIG. 9 also shows an embodiment of the above noted retaining structure in the form of two grooves 126 defined by the valve body 104 (the grooves 126 can also be referred to as slots). When pivotally connected to the valve body 104, the closure 100 can be moved from the open position to a closed position by pivoting the closure 100 upwardly and by pulling up on the closure 100 in order for the closure 100 to be further rotated to align the posts fitted in the apertures 118 with the grooves 126. When the posts in question are aligned with the grooves 126, the closure 100 is lowered to the closed position to insert the posts 134 into the grooves 126, thereby releasably securing the closure to the valve body. The posts 134 can be referred to as a mating element of the closure and the grooves 126 can be referred to as a mating element of the valve body. The grooves 123 are complementary mating elements to the posts 134. The closure 100 and the valve body 106 define a latch mechanism to releasably secure the closure to the valve body. The latch mechanism includes the posts 134 and the grooves 126.

Figure 10:
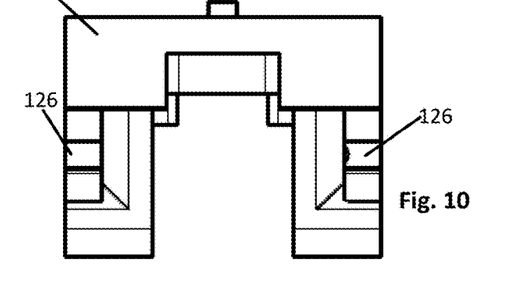
FIG. 10 shows a top view of the valve body of FIG. 9.
Figure 11:
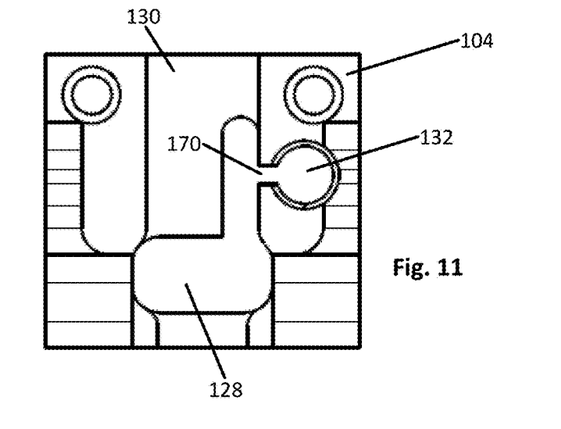
FIG. 11 shows a front view of the valve body of FIG. 9.

FIG. 10 shows a top view of the valve body 104. FIG. 11 shows a front view of the valve body 104, which defines a passageway 128 for a plunger tip and also defines a cavity 130 to receive the insert 108 (which can be thermally conductive) shown at FIG. 3. The valve body 104 also defines an opening 132 in which a valve open sensor (e.g. a reed switch) can be installed. The passageway 128 can also be referred to as a plunger aperture.

The opening 170 between the opening 132 and the passageway 128 allows removal of the pinch valve from a dispensing machine without disconnecting the wire of the reed switch or other sensors or inserts. Also, the insert 108 (shown at FIG. 8) can have an electrically connected thermistor to monitor temperature. This can also be removed without disconnecting the wires, due to the cutout feature of the valve body.

Figure 12:
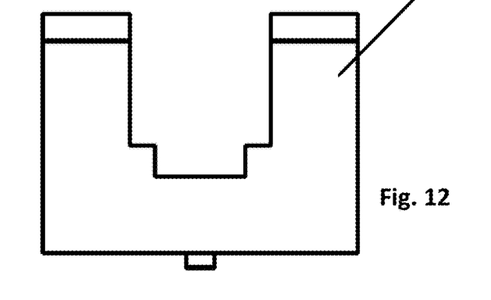
FIG. 12 shows a bottom view of the valve body of FIG. 9.
Figure 13:
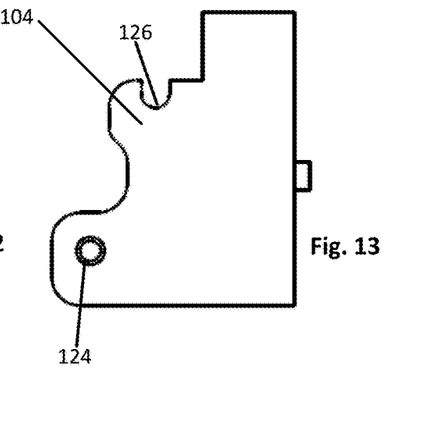
FIG. 13 shows a side view of the valve body of FIG. 9.

FIG. 12 shows a bottom view of the valve body 104 and FIG. 13 shows a side view of the valve body 104.

FIG. 14 shows an exploded view of the pinch valve 98 where the closure 100, the valve body 104, the insert 106, the insert 108, the slot 116, the apertures 124, and the grooves 126 are shown. Also shown is the recess 114 of the closure 100, a recess 107 of the insert 106 and a recess 109 of the insert 108. The recesses 114, 107 and 109 define a passageway in the valve body to hold the dispensing tube in the pinch valve when the dispensing tube is installed in the pinch valve and the pinch valve is closed. The pivot axis about which the closure 100 pivots is perpendicular to the passageway in which the dispensing tube (liquid-dispensing tube) is held. In other embodiments, the pivot axis about which the closure 100 pivots is substantially perpendicular (90°+/−10°) to the passageway in which the dispensing tube (liquid-dispensing tube) is held.

Also shown are the posts 134 that fit into the apertures 118 (see FIG. 5) of the closure 100, the pivot pin 136 (or pivot member) that is used to pivotally connect the closure 100 to the valve body 104, and a magnet 138 that can be installed in the recess 123 of the closure (see FIG. 8). In this embodiment, the posts 134 are parallel to rotation axis of the closure 100.

Even though the embodiment above describes the closure and the valve body being pivotally (hingedly) connected to each other through a pivot pin, any other suitable way of pivotally connecting the closure to the valve body is to be considered within the scope of the present disclosure. For example, any suitable snap-fit hinge arrangement connecting the closure to the valve body is within the scope of the present disclosure.

Further, even though the embodiment above describes the closure and the valve body being releasably secured to each other through the posts 134 and the grooves 126, any other suitable means of releasably securing the closure to the valve body is to be considered within the scope of the present disclosure. For example, any suitable cantilever snap joint arrangement releasably securing the closure to the valve body is within the scope of the present disclosure. The posts 134 can be referred to as a mating element of the closure and the grooves 126 can be referred to as a mating element of the valve body. The grooves 123 are complementary mating elements to the posts 134.

As will be understood by the skilled worker, even though the embodiment above describes the closure as being pivotally secured to the valve body and as being translatable perpendicularly to the pivot axis (pivot pin), this need not be the case. For example, when the mechanism for releasably securing the closure to the valve body does not require pulling on the closure in order to mate a mating feature of the closure (e.g., the posts 134) to a corresponding mating feature on the valve body (e.g., the grooves 126), then the pinch valve does not need to be configured to allow for the translation of the closure perpendicularly to the pivot axis of the closure.

The closure 102 and the valve body 104 of the pinch valve can be made of any suitable material such as, for example, acetal, high-density polyethylene, etc. The closure insert 106 and the valve body insert 106 can be made of any suitable thermally conductive material such as, for example, aluminum, copper etc.

Plunger assemblies of various types can be used in the pinch valve without departing from the scope of the present disclosure. For example, a solenoid-activated plunger assembly, a manually activated plunger assembly, stepper motor plunger assembly, or any other suitable electromechanical plunger assembly can be used.

Advantageously, the pinch valve of the present disclosure has a closure that pivots downwardly from the valve body when going from the closed configuration of the pinch valve to the open configuration of the pinch valve. This greatly reduces the risk of damage to the pinch valve in that the likelihood of the door of the liquid dispenser unit interfering with the closure of the pinch valve when the pinch valve is in the open configuration is essentially nil. Further, the likelihood of the bag of liquid to be dispensed interfering with the closure when inserting the bag into the liquid dispenser unit is also greatly reduced.

Additionally, the pinch valve of the present disclosure can be configured to be retrofitted, in the field, to existing liquid-dispensing machines and, the pinch valve can be configured (dimensioned) to use existing closure and valve body thermally conductive inserts. Similarly, the pinch valve of the present disclosure can be configured to use the existing reed switch assemblies already in the field.

Further, pinch valve of the present disclosure does not require any tool for servicing or cleaning and, can be opened/closed with one hand.

Furthermore, there is no need to fasten/unfasten fasteners to close/open the pinch valve of the present disclosure.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A pinch valve for a liquid-dispensing unit, the pinch valve comprising:
   a valve body for mounting to a liquid dispenser unit; and
   a closure pivotally secured to the valve body in a clamshell arrangement, the valve body and the closure configured to define a passageway to hold a liquid-dispensing tube when the pinch valve is in a closed configuration, the valve body and the insert further configured for rotation of the closure relative to the valve body, the rotation being about a rotation axis that is substantially perpendicular to the passageway, the closure defining a recess portion configured to overlap a portion of the liquid-dispensing tube when the pinch valve is in an open configuration and the closure is in an open position, the recess portion being shaped to fit around the portion of the liquid-dispensing tube.

2. The pinch valve of claim 1 wherein the valve body and the closure have counterpart mating elements to releasably secure the closure to the valve body when the pinch valve is in the closed configuration.

3. The pinch valve of claim 2 wherein the counterpart mating elements include a post connected to the closure and a slot defined on the valve body, the slot to retain the post when the pinch valve is in the closed configuration.

4. The pinch valve of claim 3 wherein the pinch valve is configured for translation of the closure perpendicular to the rotation axis, the translation of the closure and the rotation of the closure to position the post into the slot to removably secure the closure to the valve body.

5. The pinch valve of claim 4 further comprising a pivot pin secured to the valve body and oriented collinearly to the rotation axis, the closure defining an aperture, the pivot pin traversing the aperture, the aperture configured for the rotation of the closure about the pivot pin, the aperture also configured for the translation of the closure perpendicular to the pivot pin.

6. The pinch valve of claim 5 wherein the pivot pin is a thumbscrew.

7. The pinch valve of claim 3 wherein the closure defines a post aperture, the post being inserted in the post aperture.

8. The pinch valve of claim 3 wherein the post is parallel to the rotation axis.

9. The pinch valve of claim 1 wherein the closure defines a grip for gripping by a user to rotate the closure with respect to the valve body.

10. The pinch valve of claim 9 wherein the grip is also for gripping by a user to raise the closure with respect to the valve body.

11. The pinch valve of claim 1 wherein the valve body and the closure are further configured to define a throttle region in the passageway, the throttle region to throttle a flow of liquid in the liquid-dispensing tube when the liquid-dispensing tube is held in the passageway.

12. The pinch valve of claim 1 further comprising a thermally conductive valve body insert positioned in the valve body, the thermally conductive valve body insert to thermally contact the liquid-dispensing tube, the thermally conductive valve body insert configured for connection to a cooling device to extract heat from the liquid-dispensing tube.

13. The pinch valve of claim 12 further comprising a thermally conductive closure insert positioned in the closure, the thermally conductive closure insert being in thermal contact with the thermally conductive valve body insert when the pinch valve is in the closed configuration.

14. The pinch valve of claim 1 wherein the closure defines a wall portion and the valve body defines a plunger aperture, the plunger aperture is configured to receive a plunger tip of a plunger assembly, the plunger assembly configured to releasably bias the plunger tip against the liquid-dispensing tube to pinch the liquid-dispensing tube against the wall portion.

15. The pinch valve of claim 1 wherein the valve body defines an aperture configured to receive a fastener to fasten the valve body to the liquid dispenser unit.

16. A pinch valve for a liquid-dispensing unit, the pinch valve comprising:
a valve body for mounting to a liquid dispenser unit; and
a closure, the valve body and the closure configured to define a passageway to hold a liquid-dispensing tube when the pinch valve is in a closed configuration, the valve body and the insert further configured for rotation of the closure relative to the valve body, the rotation being about a rotation axis that is substantially perpendicular to the liquid-dispensing tube when the dispensing tube is held in the passageway, the closure defining a recess portion configured to overlap a portion of the liquid-dispensing tube when the pinch valve is in an open configuration and the closure is in an open position, the recess portion being shaped to fit around the portion of the liquid-dispensing tube.

17. The pinch valve of claim 16 further comprising a latch mechanism to releasably secure the closure to the valve body.

18. The pinch valve of claim 17 wherein the latch mechanism includes a post formed on the closure and a slot defined on the valve body, the slot to retain the post when the pinch valve is in the closed configuration.

19. A pinch valve for a liquid-dispensing unit, the pinch valve comprising:
a valve body for mounting to a liquid dispenser unit; and
a closure pivotally secured to the valve body in a clamshell arrangement, the valve body and the closure configured to define a passageway to hold a liquid-dispensing tube when the pinch valve is in a closed configuration, the valve body and the insert further configured for rotation of the closure relative to the valve body, the rotation being about a rotation axis that is substantially perpendicular to the passageway, the valve body and the closure having counterpart mating elements to releasably secure the closure to the valve body when the pinch valve is in the closed configuration, the counterpart mating elements including a post connected to the closure and a slot defined on the valve body, the slot configured to retain the post when the pinch valve is in the closed configuration, the pinch valve being configured for translation of the closure perpendicular to the rotation axis, the translation of the closure and the rotation of the closure to position the post into the slot to removably secure the closure to the valve body.

* * * * *